Aug. 12, 1958 D. C. ENGELBART 2,847,615

MEMORY DEVICE

Filed Nov. 28, 1956 2 Sheets-Sheet 1

INVENTOR.
Douglas C. Engelbart
BY Manfred M. Warren
His attorney

Aug. 12, 1958 D. C. ENGELBART 2,847,615

MEMORY DEVICE

Filed Nov. 28, 1956 2 Sheets-Sheet 2

INVENTOR.
Douglas C. Engelbart
BY Manfred M. Warren
His Attorney 2,847,615
Patented Aug. 12, 1958

2,847,615

MEMORY DEVICE

Douglas C. Engelbart, Oakland, Calif., assignor to Digital Techniques, Inc., Berkeley, Calif., a corporation of California Application November 28, 1956, Serial No. 624,908

6 Claims. (Cl. 315—84.6)

The invention relates to the digital computer art, and, more particularly, to stored-charge memory systems used in such art. The present application is a continuation in part of my copending applications:

| Serial No. | Filed | For— |
|---|---|---|
| 521,555 | July 12, 1955 | Electric Discharge Device. |
| 588,021 | May 29, 1956 | Glow Discharge Device. |
| 588,022 | do | Do. |
| 624,907 | November 28, 1956 | Electric Controlled Information-bearing Device. |
| 624,906 | do | Glow Discharge Device. |

An object of the present invention is to provide a memory device of the character described which will afford, in a comparatively simple and reliable structure, a memory system of the gaseous electronic type using high frequency glow discharges, and which is compatible with, and may be used in conjunction with, the serial shifting register of the multiple position glow discharge type, as more particularly set out in my copending applications above.

Another object of the present invention is to provide a memory device of the above character which, while being relatively small and compact, is yet capable of storing and making instantly available large numbers of information items.

A further object of the present invention is to provide a memory device of the character described, which is composed of a minimum number of sturdily formed parts which may be fabricated and assembled by relatively low cost mass production techniques.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawings.

It can be shown that the diffusion processes in the gaseous discharge cell are such as to bring all of the bounding surfaces of the discharge into relative equilibrium potentials, and that space currents will always flow to these bounding surfaces during discharge so as to bring the surfaces to, and maintain them at, their equilibrium value. Advantage is taken of this phenomena in the present invention by forming one of the dielectric surfaces of the discharge region of the cell as a thin film or coating over a conducting surface, so as to provide a relatively large capacitance, per unit area, between the gas exposed surface of the dielectric coating and the conducting surface. The charge stored by this capacitance is held fixed when a discharge is not present within the vessel, but will change to bring the dielectric surface to its equilibrium value whenever a discharge is initiated. The resulting charge displacement will thus contain the information as to what relative potential change had taken place since the termination of the last discharge.

The present invention then consists briefly of a gaseous discharge cell, a conductor which is mounted in a capacitance coupled relation to a dielectric boundary of a gaseous discharge region of the cell, and which is shielded from contact with the gas in the region, and some means electrically coupled to the dielectric boundary through the gaseous discharge in the cell. The capacitor thus formed is used for storing a charge representing the information to be held and connection to this capacitor is made by effecting electrical discharge in the cell, the electrical discharge thus operating as a selector switch.

Figures 1, 2, 3, 4:
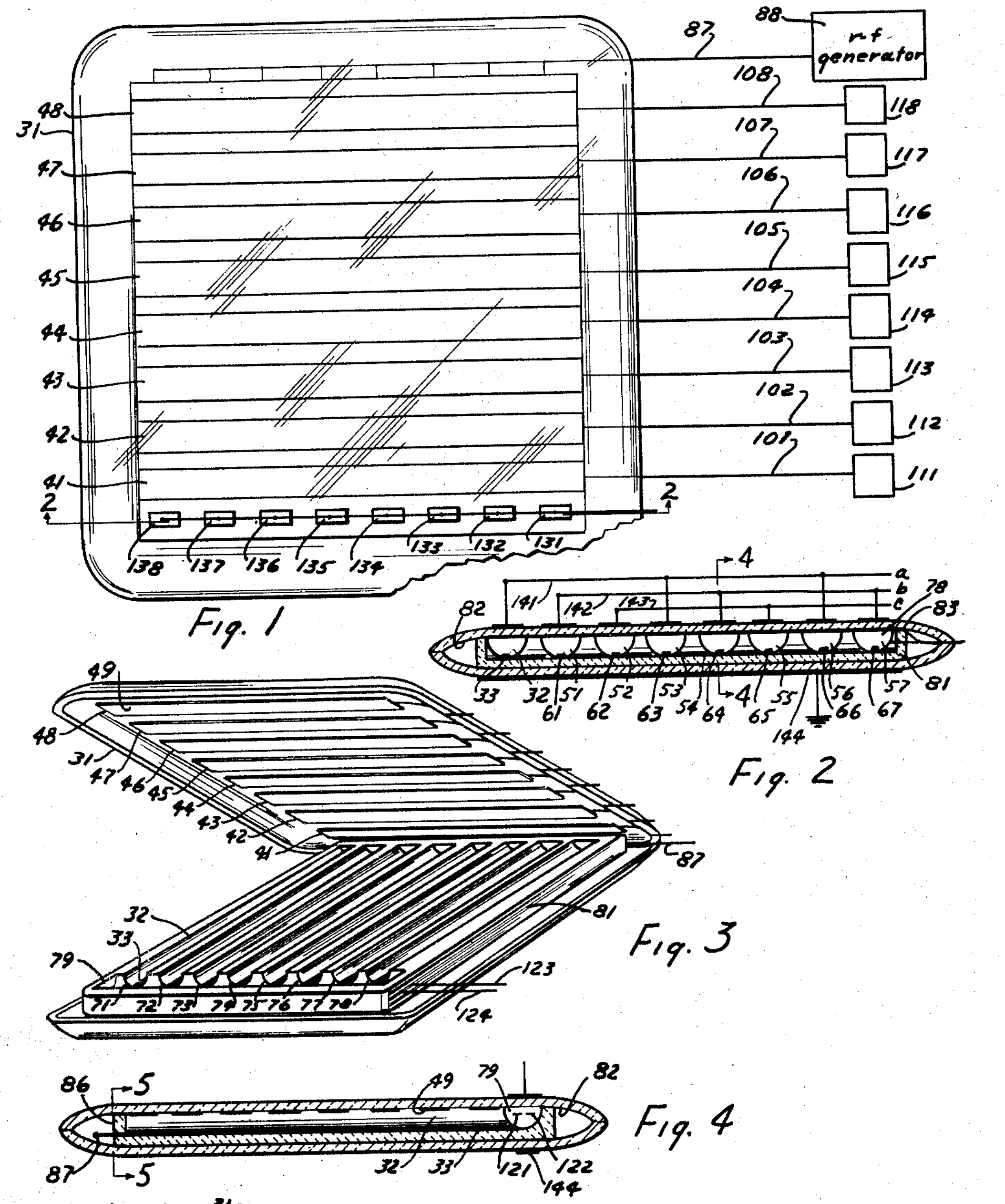
Figure 1 is a plan view of a memory device constructed in accordance with the present invention, with certain electrical connections and apparatus being diagrammatically indicated.
Figure 2 is a cross-sectional view of the device taken substantially on the plane of the line 2—2 of Figure 1.
Figure 3 is a perspective view of parts of the device opened up for viewing the interior of the device.
Figure 4 is a cross-sectional view of the device taken substantially on the plane of line 4—4 of Figure 2.
Figure 5:
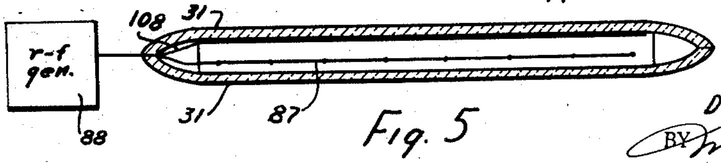
Figure 5 is a cross-sectional view of the device taken substantially on the plane of line 5—5 of Figure 4.
Figure 6:
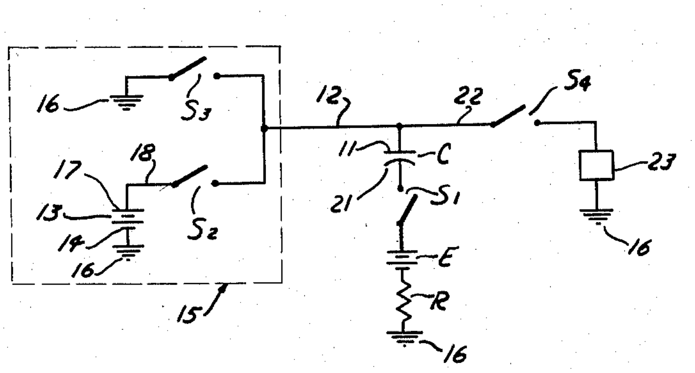
Figure 6 is a simplified schematic drawing showing one of the electrical equivalent circuits.

The equivalent electric circuit is illustrated in Figure 6 of the drawing. The gaseous discharge cell is represented by switch $S_1$, capacitor C, battery E representing the constant equilibrium potential, and resistance R. One side of switch $S_1$ is connected to one plate 21 of capacitor C and the other side of switch $S_1$ is connected through battery E and resistance R to a common ground 16. The information to be stored is represented by a potential derived from an information source, generally depicted by numeral 15, which is connected by conductor 12 to plate 11 of capacitor C opposite plate 21. Information source 15 is here, for simplicity, shown composed of a battery 13 having one side 14 connected to the common ground 16, and its opposite side 17 connected by conductor 18 through switch $S_2$ to conductor 12. Other information is here represented by a zero or ground voltage connected to conductor 12 through switch $S_3$. Of course, it will be understood that the information potential emanating from source 15 may, in normal practice, assume any value within reasonable operating limits, and the charge-establishing potential here depicted as entering the system by the closing of switch $S_2$ or $S_3$ may in actual practice originate from a wide variety of computer or other devices and may represent a "yes" or "no" or equivalent type of information. A charge will be established on C when switch $S_1$ is closed (a discharge established in the cell) to bring the potential across C in equilibrium with the potential of E and the potential of conductor 12. In the above illustration, either of two different charge values will be thus established, depending upon whether switch $S_2$ or switch $S_3$ is closed.

Figure 7:
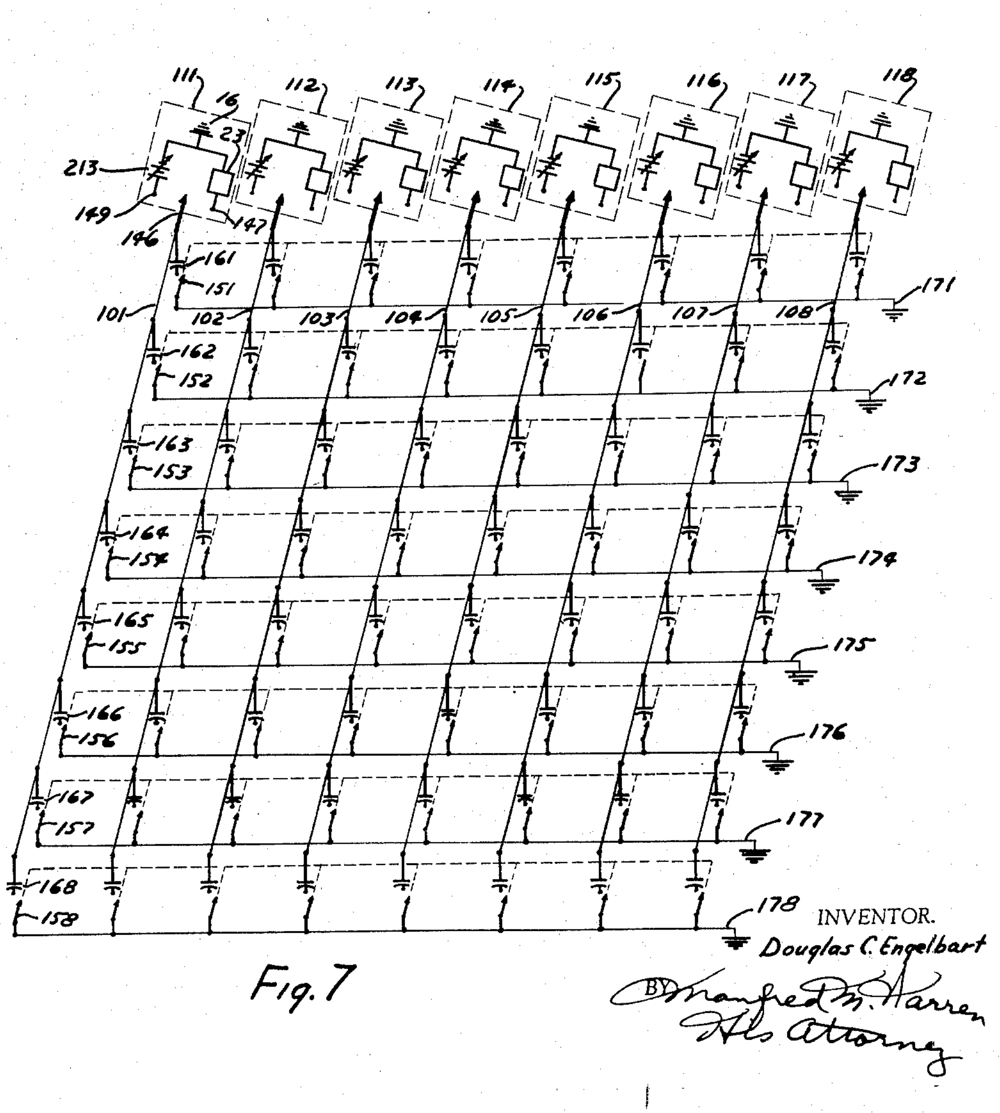
Figure 7 is a further simplified schematic diagram showing the electrical equivalent circuits for the whole device.

In accordance with the present invention, the charge establishing potential coming over conductor 12 may, at any time that it is desired to store the information, be impressed on capacitor C by effecting an electrical discharge in the cell. After the charge, representing the information to be held, is thus established in capacitor C, the electrical discharge in the cell is discontinued thus, in effect, opening switch $S_1$. This leaves the desired charge on capacitor C, and this charge may thus be effectively held until it is desired to recall the information stored. To do this, the cell, and capacitance C, are connected by conductor 22 and switch $S_4$ to a readout device 23, also here shown connected to a common ground 16. Accordingly, by closing switch $S_4$ and then firing the cell, viz., closing switch $S_1$, the charge impressed on capacitor C will be measured by readout device 23. As will be understood, the equilibrium voltage E, and the resistance R are both constants (assuming a constant discharge excitation voltage), and hence do not impair the absolute accuracy of the operation. The presence of both the equilibrium voltage and the internal resistance may therefore be disregarded, and is so disregarded in the more complete simplified electrical equivalent circuit for the whole device as depicted in Figure 7.

In one of its simplest forms, then, the memory device of the present invention consists of a gaseous discharge cell having a pair of electrodes arranged, when energized, to produce a glow discharge in the cell, and wherein one of the electrodes is separated from the discharge region by a thin film of dielectric material so as to define the capacitor C, and the other electrode is preferably placed in contact with the gas in the cell so as to be conductively coupled to the dielectric boundary during discharge. I have found, however, that it is possible to provide a plurality of such cells in a single gaseous discharge channel. The apparatus, as illustrated in Figures 1 through 5 of the drawings, may consist briefly of an envelope 31 containing an ionizable gas such as neon, argon, or the like at a pressure of approximately 15 mm. Hg, and providing a gaseous discharge channel 32, an electrode 33 mounted along the channel 32, a plurality of electrodes 41, 42, 43, 44, 45, 46, 47 and 48 which are mounted in longitudinally spaced relation along the channel 32 and cofunction with electrode 33 to define a plurality of cells and, when appropriately energized, to provide glow discharges in these cells, and a coating 49 of dielectric material covering electrodes 41–48 and separating these electrodes from the gas in channel 32.

The apparatus is preferably made as a grid-like arrangement, as seen in the drawings, having a plurality of gaseous discharge channels of the type referred to above as channel 32, the balance of the channels being here referenced in the drawings by numerals 51, 52, 53, 54, 55, 56 and 57. These channels are preferably arranged in side by side parallel relation as illustrated, and each contain an elongated electrode, similar to electrode 33, the other electrodes being referred to in the drawings by reference numerals 61, 62, 63, 64, 65, 66 and 67. In this way, the electrodes 41–48 may be extended and arranged to traverse all of the channels in longitudinally spaced relation, and to cofunction with all of the electrodes 33 and 61–67 to define a plurality of cells in each of the channels.

Electrical discharge in each of the channels may be conveniently effected by exciting the lengthwise extending electrodes 33 and 61–67 with R.-F., thus causing the associated channel to be filled with a glow discharge. Energization of any one discharge channel will allow reading or writing information into, or out of, the storage capacitors associated with that channel, as above explained. Selection of the proper channel may be done by switching R.-F. to the appropriate channel, or by energizing all of the R.-F. electrodes 33 and 61–67 at a level between breakdown and extinction voltages so as to sustain and propagate an existing glow in the channels, but being incapable of initiating such a glow discharge, and then selectively priming the channel desired with a glow discharge which will then fill the channel, and only this channel will be active as memory. A suggested R.-F. excitation for this latter purpose would be in the order of 20–30 megacycles, 5 to 15 volts R. M. S.

As a feature of the present invention, selective priming of the channels may be accomplished by connecting the ends 71, 72, 73, 74, 75, 76, 77 and 78 of channels 32 and 51–57 to a channel 79 of a serial shifting register of the multiple position glow discharge type capable of sustaining and selectively shifting a discrete glow discharge into registration with the ends 71–78. This type of register is more fully disclosed and claimed in my copending applications aforesaid.

In the fabrication of the device, the envelope may be formed of glass, and the channels 32 and 51–57 are preferably formed in a dielectric member 81 mounted in the envelope. As will be best observed from Figure 2, member 81 is here formed with a plurality of grooves (defining channels 32 and 51–57) in one side 83 thereof mounted in engagement with one side 82 of the envelope for closing off the channels. Electrodes 33 and 61–67 are preferably mounted in the base of the channels and extend longitudinally of the channels. At one end of the channels, see Figure 4, electrodes 33 and 61–67 are extended through an end wall portion 86 of member 81 and are connected to a transversely extending conductor 87, see Figure 5, which is taken out of the envelope 31 and connected to an R.-F. generator 88, see Figures 1 and 5.

The transverse, information reading and writing electrodes 41–48 are preferably mounted on envelope side 82, and may be composed of elongated metallic strips of any convenient form. If desired, these electrodes may be formed by the vacuum deposition of metal or in the manner of making printed circuits. The dielectric coating 49 covering the conducting surfaces representing electrodes 41–48 may be made very thin as by depositing the dielectric material, as by evaporation, over the conductive coatings 41–48. A surface to conductor capacitance may thus be readily obtained of substantial magnitude for very satisfactory voltage ratings. Good quality dielectrics are capable of holding a charge on the capacitance practically indefinitely so that the memory system of the present invention may be considered, for practical purposes, as a permanent one, and not in the volatile class requiring frequent inspection for the purposes of reinstating charges decaying towards ambiguous values.

The member 81 may be formed of any good quality plastic or ceramic material of high dielectric strength. Many of such materials are available commercially which may be manufactured by molding or machining. To supply an example, a machinable ceramic material known as Al Si Mag 222 sold by American Lava Corporation is noted. This material is a porous type of fired lava having a physical strength comparable to dry press porcelain and may be machined to desired shapes and forms.

The reading and writing electrodes 41–48 are connected to conductors 101–108 which are brought out through the envelope 31 for connection to a plurality of information sources 111–118 of the general type offering electric potentials representing information to be stored and as generally characterized as information source 15 hereinafter described.

The serial shifting register for selectively shifting a glow discharge into the several channels 32 and 51–57 here includes the elongated transversely extending channel 79 which has, at one end thereof, a pair of glow starting electrodes 121 and 122 which are connected to conductors 123 and 124 brought out through the envelope for connection to a suitable voltage source capable of initiating or setting a localized glow discharge in what may be considered a localized cell here adjacent the end of channel 78. The glow discharge thus entered in the channel may be shifted longitudinally of the channel by means of a plurality of electrodes 131, 132, 133, 134, 135, 136, 137 and 138 which are arrayed along the length of channel 79 and located at the ends of the intersecting channels 71–78. Electrodes 131–138 may be connected, as here depicted, to three R.-F. voltages *a*, *b* and *c* as by conductors 141, 142 and 143. In keeping with the teachings of my copending applications, voltages *a*, *b* and *c* are sufficient to sustain a discrete glow discharge in the channel and to transfer such glow discharge if primed by an adjacent glow discharge, but which are insufficient to initiate a glow discharge without such priming. R.-F. excitation in the order of 20 to 25 megacycles per second and a magnitude of 60 to 120 volts R. M. S. is suggested. Accordingly, by phasing voltages *a*, *b* and *c*, the single glow discharge entered in the channel 79 may be shifted at very high speed, and very precisely, into registration with any of the channels 71–78. Electrodes 131–138 may be mounted on the outside of the envelope, as here illustrated, and cooperate with a common ground electrode 144 at the opposite side of the envelope so as to effect selective localized energization of channel 79 at each of the connections of channels 71–78. Electrode 144 may consist of a simple strip of metal mounted on what is here depicted as the underside of the envelope in the common vertical plane of the channel 78 and the plurality of electrodes 131–138 mounted on what is here depicted as the upper side of the envelope. Electrodes 131–138 may similarly be of any desired metal conducting form suitably attached to the envelope.

As will be understood, the device of the present invention may be made in various sizes containing various numbers of reading and writing electrodes 41–48 and various numbers of glow discharge channels 33 and 51–57. The number of electrodes 41–48 determines the number of information items to be stored, thus determining the length of the word, phrase or number which can at any one time be held by the device. The number of glow channels 33 and 51–57 determines the number of such whole words, phrases, numbers, etc. which may be stored. The over all operation of the device is depicted in the simple electrical equivalent diagram, Figure 7. The reading and writing elements are depicted by conductors 101–108 which are, as above noted, connected to information sources 111–118. Each of these information sources is diagrammatically illustrated as containing a two way switch 146, a generalized source 213 representing the information to be stored, a readout device 23 capable of measuring the charge in a selected storage capacitor, and a common ground connection 16, the parts being wired, as depicted, so that on throwing switch 146 to contact 149 voltages will be sent over conductors 101–108, and under appropriate conditions (discharge in one of the glow channels 71–78) the charges on the capacitors in the selected glow channel will be established to correspond to these impressed voltages. Subsequently, after an arbitrary time interval during which the above channel was kept free of any discharge, closure of switches 146 to contacts 147 and reestablishment of the discharge in this same channel allows the readout devices 23 to determine ("read") the value of the voltages which had been impressed upon conductor 101–108 during the above "write" period.

The conductor 101 is connected to a set of capacitors 161, 162, 163, 164, 165, 166, 167, and 168 representing the capacitances across the dielectric layer between the conductor 48 and a cell boundary of each of the discharge channels 71–78.

The switches 151, 152, 153, 154, 155, 156, 157 and 158 connect capacitors 161–168 to ground electrodes 171, 172, 173, 174, 175, 176, 177 and 178, and represent in simplified form the conductivity or no-conductivity afforded by the discharge or no-discharge states, respectively, within the channels 32 and 51–57. The ground electrodes 171–178 correspond functionally to the charge-displacement paths provided by R.-F. electrodes 33 and 61–67. In like manner, the remaining conductors 102–108, representing read-write electrodes 42–28, are connected through a plurality of switches and capacitors, each representing a discharge cell at the intersection of the read-write electrode and the gaseous discharge channel, to common ground electrodes 171–178. Since all of the cells in any one channel 71–78 are fired simultaneously, all of the switches in each of the horizontal rows of Figure 7 are shown as ganged for simultaneous opening and closing.

As will be understood, the information sources 111–118 may be constantly sending out their signal, or no signal, as the computing machine, of which the sources are part, does its work. At any instant when it is desired to store the information at sources 111–118, a glow discharge is shifted into registration with one of the channels 71–78, and the R.-F. generator 88 is turned on thus firing the full length of the channel and effectively closing the electrical switch at each of the cells in the channel. This is depicted by a gang closing of a bank of horizontally arranged switches in Figure 7, thus impressing the electrical potentials of the sources 111–118 on one of the horizontal banks of condensers 161–168. The R.-F. excitation provided by generator 88 is then shut off, leaving the condensers correspondingly charged. At other times, the information of sources 111–118 may be similarly stored in the other banks of capacitors in the other discharge channels. Whenever it is desired to retrieve the information so stored in any of the banks of capacitors, switches 146 are thrown to contacts 147 and the appropriate glow discharge channel is fired (by shifting a glow to that channel and turning on R.-F. generator 88), at which time the individual charges contained on the individual capacitors in the horizontal bank of capacitors, as seen in Figure 7, will be reflected and read at the individual readout devices 23 at each of the information sources 111–118, thus recalling the information held by such sources at the previous time.

I claim:

1. A memory device comprising, an envelope providing a plurality of gaseous discharge channels, a first set of electrodes mounted along said channels, and a second set of electrodes mounted to traverse said channels in longitudinally spaced relation and cofunctioning with said first set of electrodes to define a plurality of cells in each of said channels and when energized to provide glow discharges in said cells, one of said sets of electrodes being mounted in capacitance coupled relation to a dielectric boundary of each of said cells, the other of said sets of electrodes being electrically coupled to said boundaries through the gaseous discharge in said cells.

2. A memory device comprising, an envelope providing a plurality of gaseous discharge channels, a first set of electrodes mounted along said channels, a second set of electrodes mounted to traverse said channels in longitudinallly spaced relation and cofunctioning with said first set of electrodes to define a plurality of cells in each of said channels and when energized to sustain and propagate an existing glow discharge in said channels, one of said sets of electrodes being mounted in capacitance coupled relation to a dielectric boundary of each of said cells to provide a capacitor for storing a charge representing information to be held, the other of said sets of electrodes being electrically coupled to said boundaries through the gaseous discharge in said cells, and means for selectively priming said channels with a glow discharge.

3. A memory device comprising, an envelope providing a plurality of gaseous discharge channels, a second set of electrodes mounted to traverse said channels in longitudinally spaced relation and cofunctioning with said first set of electrodes to define a plurality of coils in each of said channels and when energized to sustain and propagate an existing glow discharge in said channels, one of said sets of electrodes being mounted in capacitance coupled relation to a dielectric boundary of each of said cells, the other of said sets of electrodes being electrically coupled to said boundaries through the gaseous discharge in said cells, and a serial shifting register of the multiple position glow discharge type capable of sustaining and selectively shifting a discrete glow discharge into said channels.

4. A memory device comprising, an envelope, an ionizable gas therein, a dielectric member mounted in said envelope and formed with a plurality of elongated grooves in one side thereof, a closure member of dielectric material mounted on said side closing said grooves to define a plurality of gaseous discharge channels, a first electrode mounted in and extending longitudinally of each of said grooves and in contact with the gas therein, a plurality of second electrodes of elongated form carried by said closure member and traversing said grooves so as to define with said first electrodes a plurality of longitudinally spaced cells in each of said channels, and a coating of dielectric material separating said second electrodes from said channels and providing a dielectric boundary for each of said cells.

5. A memory device comprising, an envelope, an ionizable gas therein, a dielectric member mounted in said envelope and formed with a plurality of elongated grooves in one side thereof, a closure member of dielectric material mounted on said side closing said grooves to define a plurality of gaseous discharge channels, a first electrode mounted in and extending longitudinally of each of said grooves and in contact with the gas therein, a plurality of second electrodes of elongated form carried by said closure member and traversing said grooves so as to define with said first electrodes a plurality of longitudinally spaced cells in each of said channels, a coating of dielectric material separating said second electrodes from said channels and providing a dielectric boundary for each of said cells, said dielectric boundary and said second electrodes defining a capacitor at each of said cells for storing a charge representing information to be held, an R.-F. generator connected to each of said first electrodes and furnishing a potential and frequency sufficient to sustain and propagate an existing glow discharge in said channels while being incapable of initiating such glow discharge, and means for selectively priming said channels with a glow discharge.

6. A memory device comprising, an envelope, an ionizable gas therein, a dielectric member mounted in said envelope and formed with a plurality of elongated grooves in one side thereof, a closure member of dielectric material mounted on said side closing said grooves to define a plurality of gaseous discharge channels, a first electrode mounted in and extending longitudinally of each of said grooves and in contact with the gas therein, a plurality of second electrodes of elongated form carried by said closure member and traversing said grooves so as to define with said first electrodes a plurality of longitudinally spaced cells in each of said channels, a coating of dielectric material separating said second electrodes from said channels and providing a dielectric boundary for each of said cells, said dielectric boundary and said second electrodes defining a capacitor at each of said cells for storing a charge representing information to be held, an R.-F. generator connected to each of said first electrodes and furnishing a potential and frequency sufficient to sustain and propagate an existing glow discharge in said channels while being incapable of initiating such glow discharge, said members providing a gas channel extending across and intersecting said first named channels, and means associated with said last named channel and providing a serial shifting register of the multiple position glow discharge type capable of sustaining and selectively shifting a discrete glow discharge into said first mentioned channels.

References Cited in the file of this patent

UNITED STATES PATENTS

| | | |
|---|---|---|
| 2,012,710 | Crosby | Aug. 27, 1935 |
| 2,051,601 | Hobart | Aug. 18, 1936 |
| 2,123,242 | Hollmann | July 12, 1938 |